US012190717B2

(12) United States Patent
Zaikonnikov et al.

(10) Patent No.: US 12,190,717 B2
(45) Date of Patent: Jan. 7, 2025

(54) AUDITORY GUIDANCE METHOD AND SYSTEM

(71) Applicant: Norphonic AS, Bønes (NO)

(72) Inventors: Eugene Zaikonnikov, Bønes (NO); Tron Vedul Tronstad, Bønes (NO)

(73) Assignee: NORPHONIC AS, Bønes (NO)

( * ) Notice: Subject to any disclaimer, the term of this patent is extended or adjusted under 35 U.S.C. 154(b) by 46 days.

(21) Appl. No.: 18/169,738

(22) Filed: Feb. 15, 2023

(65) Prior Publication Data

US 2023/0260379 A1 Aug. 17, 2023

(30) Foreign Application Priority Data

Feb. 16, 2022 (NO) .................................... 20220217

(51) Int. Cl.

| | |
|---|---|
| ***G08B 7/06*** | (2006.01) |
| ***G08B 3/10*** | (2006.01) |
| ***H04R 27/00*** | (2006.01) |
| ***H04R 29/00*** | (2006.01) |

(52) U.S. Cl.

CPC ............... *G08B 7/066* (2013.01); *G08B 3/10* (2013.01); *H04R 27/00* (2013.01); *H04R 29/002* (2013.01); *H04R 2227/007* (2013.01)

(58) Field of Classification Search

CPC . G08B 7/066; H04R 29/002; H04R 2227/007

See application file for complete search history.

(56) References Cited

U.S. PATENT DOCUMENTS

| | | | | |
|---|---|---|---|---|
| 5,654,690 | A * | 8/1997 | Ishikawa | G08B 25/04 340/288 |
| 7,135,960 | B2 * | 11/2006 | Arcaria | G08B 3/10 340/815.45 |
| 8,457,324 | B2 | 6/2013 | Tice | |

(Continued)

FOREIGN PATENT DOCUMENTS

| | | |
|---|---|---|
| EP | 3629604 A1 | 4/2020 |
| GB | 2225661 A | 6/1990 |

(Continued)

OTHER PUBLICATIONS

Application No. EP23156729.8 , Extended European Search Report, Mailed On Jul. 12, 2023, 11 pages.

(Continued)

*Primary Examiner* — John A Tweel, Jr.

(74) *Attorney, Agent, or Firm* — Kilpatrick Townsend & Stockton LLP

(57) ABSTRACT

An auditory guidance system is installed along a predefined pathway between an initial location and a target location. The auditory guidance system comprises a plurality of nodes arranged at intervals along the predefined pathway. A first node of the plurality of nodes is a closest node to the initial location and a last node of the plurality of nodes is a closest node to the target location. Each node of the plurality of nodes comprises two directional sound generators. Each of the two directional sound generators are configured to emit sound in a predetermined direction. The two directional sound generators within each node are pointing in opposite directions along the predefined pathway.

16 Claims, 2 Drawing Sheets

(56) References Cited

U.S. PATENT DOCUMENTS

| | | | | |
|---|---|---|---|---|
| 8,891,782 | B2 * | 11/2014 | Kim | H04R 3/12 381/71.7 |
| 10,991,216 | B1 * | 4/2021 | Alali | G08B 7/066 |
| 11,218,825 | B2 * | 1/2022 | Heggeland | G08B 29/24 |
| 11,302,339 | B2 * | 4/2022 | Laitinen | H04S 7/30 |
| 2007/0279242 | A1 | 12/2007 | Plocher | |

FOREIGN PATENT DOCUMENTS

| | | | |
|---|---|---|---|
| IT | MI20131421 | A1 | 3/2015 |
| JP | 2000194977 | A | 7/2000 |

OTHER PUBLICATIONS

NO 20220217; Norwegian Search Report dated Aug. 11, 2022; 3 pages.

Wijngaarden et al. Auditory Evacuation Beacons, L. Audio Eng. Soc., vol. 53, No. 1/2, pp. 44-63, Jan./Feb. 2005.

Tronstad et al. Sound signals to improve evacuation in road tunnels, Fire Safety Journal 125 (2021) 103431.

* cited by examiner

AUDITORY GUIDANCE METHOD AND SYSTEM

CROSS-REFERENCES TO RELATED APPLICATIONS

This application claims priority to Norwegian Patent Application No. 20220217, filed Feb. 16, 2022. The entire contents of the foregoing patent application is incorporated herein in its entirety for all purposes.

TECHNICAL FIELD OF THE INVENTION

The invention concerns an auditory guidance method and a system for executing such method.

BACKGROUND OF THE INVENTION

Public announcement (PA) systems for tunnels, corridors and other long and narrow rooms or passages, whether they are in buildings, below ground, on ships or part of any other type of structure, are fraught with problems related in particular to reverberation, echo, and interference between loudspeakers that are mounted at a distance from each other. These problems may become critical in emergencies where correct receipt and interpretation of information is essential in order to inform and guide people who are evacuating for example a tunnel. However, the problems are also relevant to situations that are not critical.

Currently, information helping people navigate in long corridors rely heavily on visual aids such as signs, arrows, and markings on the floor. Visual aid solutions are numerous, but they have the disadvantage of poor performance in low visibility and smoke. Audio is under-utilized. Auditory assistance systems do exist but are basic PA systems with only minor adaptations to the specific challenges associated with long tunnels and corridors.

EP 3 629 604 A1 describes a conventional sound system and associated devices and methods for delivering synchronized sound in long and narrow passageways such as tunnels and corridors. The system includes nodes installed at intervals in the passageway, each node having a microphone and two speakers, one pointing in each direction. Configuration of the system includes a first phase where the relative position of nodes to each other is determined by each node playing a test sound and the remaining nodes report the arrival time and/or sound level registered by its microphone, and a second phase where the distance between adjacent nodes is determined by one node playing a test sound and an adjacent node registering the delay caused by propagation of the sound between the two nodes. During use the system is configured to play in a manner synchronized based on the determined delays.

US 20070279242 A1 describes a conventional system comprising a plurality of directional sounders located in a region. The sounders can being monitored and synchronously and sequentially activated in various patterns to establish an audibly defined exit route from the region. Emitted audio, from a respective sounder, can be different than the audio emitted by other activated sounders to provide a path and direction for evacuation to individuals in the vicinity of the exit route.

The paper "*Auditory Evacuation Beacons*", by van Wijngaarden, Bronkhorst, and Boer, published in *J. Audio Eng. Soc* Vol. 53, No. 1/2, 2005 January/February, describes the conventional use of so-called "auditory evacuation beacons" to guide people to safe exits from a smoke-filled room. A sound beacon is defined as "a sound source placed near an exit." The beacon comprises a loudspeaker, and may be an omnidirectional or a directional loudspeaker, depending on the circumstances. According to Section 1.3 of this paper, (page 47, second paragraph), "the direction of the route is coded using time delays. Signals are reproduced by the beacons at different delays." Section 2.2 (page 49, sixth paragraph) discusses how "[t]he delay of beacon E (the first beacon of the route) is also increased to compensate for the travel time of the signals of the other."

IT MI20131421 A1 describes a conventional system having a plurality of acoustic emitters operatively connected to each other to emit a sound signal in sequence at different times from each other, in particular with a progressive signal emission delay between a loudspeaker and the next one.

Conventional systems are also described in the paper "*Sound signals to improve evacuation in road tunnels*", by Tronstad, Jenssen, Moscoso, Sodersten, and Zaikonnikov, published in *Fire Safety Journal* 125 (2021) 103431 on 26 Aug. 2021.

SUMMARY OF THE INVENTION

The invention is set forth and characterized in the main claim, while the dependent claims describe other characteristics of the invention.

It is thus provided an auditory guidance system for installation along a predefined pathway between an initial location and a target location, comprising a plurality of nodes arranged at intervals along the pathway, wherein a first node is the closer node to the initial location and a last node is the closer node to the target location, characterized in that each node comprises two directional sound generators that each is configured to emit sound in a predetermined direction, and the sound generators within each node are pointing in opposite directions along the pathway.

In one embodiment, the directional sound generators are loudspeakers with small apertures arranged into an array. Each sound generator in each node may be configured and controlled via a control system to emit a sound pulse with predefined characteristics, for example duration, pitch, volume. In one embodiment, said sound pulses comprises bell chimes or sound of footsteps on pavement. The system may be configured to emit the same sound pulse from all the nodes.

In one embodiment, the nodes are configured to be activated in a sequence, from the initial location and towards the target location.

In one embodiment, sound generators in each node may be controlled to emit the same sound pulse at the same time, or to emit sound pulses in a desired sequence.

In one embodiment, each sound generator is configured to emit a sound pulse towards the initial location, in a sequence from the directional sound generator in the first node to the directional sound generator in the last node, each sound pulse emission being interrupted by a constant time interval. In one embodiment, the sound pulse duration is constant.

The guidance system may be used as an evacuation system in a tunnel or other confined space, and the target location may be an emergency exit or another opening out of the tunnel or confined space.

It is also provided an auditory guidance method, for guiding at least one individual along a predefined pathway from an initial location to a target location, characterized by emitting directional sound pulses from a plurality of nodes arranged at intervals along the predefined pathway between the initial location and the target location, said directional sound pulses being emitted in a sequence at time intervals such that each node emits a directional sound pulse towards the initial location; wherein a second node is emitting a sound pulse at a time interval following the emission of a sound pulse from a first node, a third node is emitting a sound pulse at a time interval following the emission of a sound pulse from the second node, and so on until a last node has emitted a sound pulse; whereby the sequential emission of sound pulses from the same side directional sound generators in subsequent nodes creates a spatial effect and an illusion of a sound travelling towards the target location and thus encourages the individual to follow the sequentially emitted sounds pulses.

In one embodiment, the time interval is constant. The pathway may be inside a tunnel or other confined space, and the target location may comprise an emergency exit or another exit from the tunnel or other confined space, and the sound pulse duration may be determined such that it is significantly shorter than the reverberation time for the tunnel or other confined space. In one embodiment, the method is executed in multiple segments of nodes, either simultaneously of at different intervals. The method may be executed by the invented auditory guidance system.

BRIEF DESCRIPTION OF THE DRAWINGS

These and other characteristics of the invention will become clear from the following description of embodiments of the invention, given as non-restrictive examples, with reference to the attached schematic drawings, wherein.

DETAILED DESCRIPTION OF EMBODIMENTS OF THE INVENTION

Figure 1:
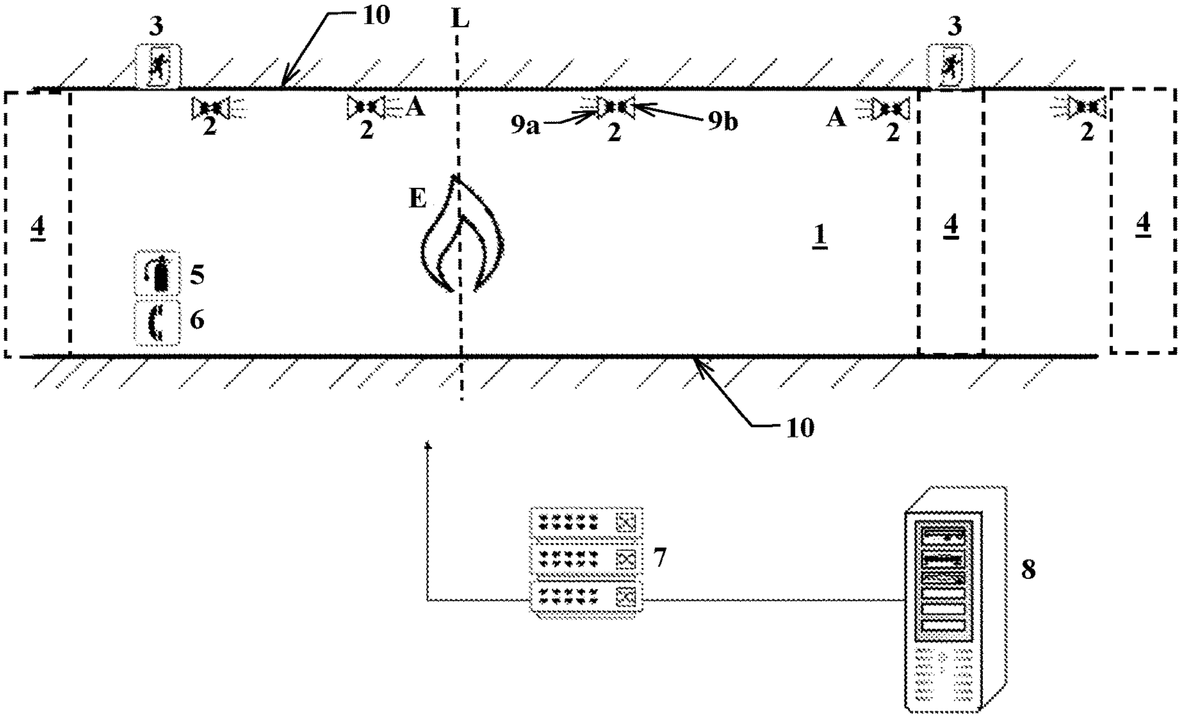
FIG. 1 is a schematic illustration of an embodiment of the auditory guidance system according to the invention.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring initially to FIG. 1, the invented auditory guidance system comprises a plurality of nodes 2 arranged along a predefined pathway 1. The predefined pathway 1 may be a roadway inside a tunnel or any other surface in a confined space (such as a mine shaft, rail tunnel, corridor) or room. The predefined pathway 1 may also be in the open, out of doors. The nodes 2 are arranged at intervals along the pathway 1, on a wall along the pathway, in a ceiling above the pathway, or on another suitable support. It should be understood that there may be several more nodes than what the figure indicates, for example in a long tunnel. The distance between the nodes may be known or be determined by the system, for example as described by EP 3 629 604 A1. The distance between the nodes may for example be between 10 and 30 meters, but this invention shall not be limited to this interval.

In FIG. 1, the predefined pathway 1 is inside a confined space having walls 10 with side exits (e.g. emergency exits) 3, a fire extinguisher 5 and an emergency phone 6, and the nodes 2 are connected to one of a plurality of switches 7 and controlled by a control system 8. However, the invention shall not be limited to this configuration.

Reference number 4 denotes a target area for the auditory guidance performed by the nodes 2. A target area may for example be at a tunnel opening or the exit from a corridor or other confined space, or one of the emergency exits 3. These areas 4 and exits 3 will therefore in the following also be referred to as "target locations".

Each node 2 comprises two directional sound generators 9*a,b* that each are configured to emit sound in a predetermined direction. The directional sound generators may be assembled in a common housing, but not necessarily. In the embodiment illustrated in FIG. 1, the two directional sound generators 9*a,b* are pointing along the predefined pathway 1 and in opposite directions.

The directional sound generators 9*a,b* may be loudspeakers, for example loudspeakers with small apertures arranged into an array. The left and right facing directional loudspeakers in each node provides for optimal use of acoustic energy. For example, referring to FIG. 2, a person located between two nodes $\mathbf{2}_1$, $\mathbf{2}_2$ will perceive the sound generated by the right-hand sound generator $\mathbf{9}a_1$ as being substantially (e.g. more than 12 dB) lower than the sound generated by the left-hand sound generator $\mathbf{9}b_1$ of the same node $\mathbf{2}_1$.

The use of such directional loudspeakers contributes to reducing the reverberation effects that may be pronounced in confined spaces, such as tunnels. This is an advantage over the prior the non-directional loudspeakers of the prior art PA systems, where reverberation effects may last several seconds and render precise auditory guidance impossible.

Each sound generator 9*a,b* in each node 2 is configured and controlled (e.g. via the control system 8) to emit a sound pulse A with predefined characteristics (e.g. duration, pitch, volume). Examples of emitted sound pulses are bell chimes, sound of footsteps on pavement, but a number of other sounds are conceivable. The system may be configured to emit the same sound pulse from all the nodes, or the sound pulse characteristics and type may be different between the nodes. The nodes are configured to be activated in a sequence, from an initial location L and towards the target location 4.

Figure 2:
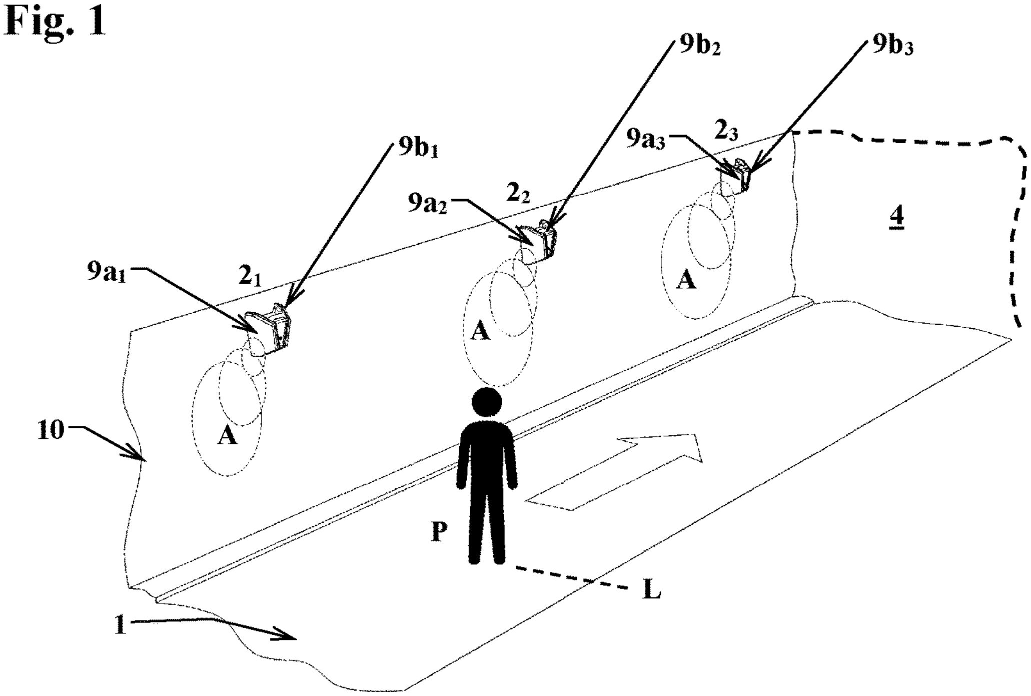
FIG. 2 is a schematic illustration of an embodiment of the auditory guidance method and system according to the invention.

Sound generators 9*a,b* in each node 2 may be controlled to emit the same sound pulse at the same time, or to emit sound pulses in a desired sequence, as will be explained in the following, with reference also to FIGS. 2-4.

If it is desirable to guide one or more individuals P away from a location L, where for example a fire E or other critical event may have occurred, to a target location (e.g. a tunnel opening 4 or an emergency exit 3), the invented auditory guidance system may be operated in a manner described in the following.

A node $\mathbf{2}_1$, which is the closer one to the individual P (and therefore for the purpose of illustrating the method is designated as a first node), is activated such that its sound generator $\mathbf{9}a_1$ facing the initial location L emits a directional sound pulse A. Then, after a time interval Δt, a subsequent, second, node $\mathbf{2}_2$, which is adjacent to the first node $\mathbf{2}_1$ but farther away from the initial location L, is activated such that its sound generator $\mathbf{9}a_2$ facing the first node $\mathbf{2}_1$ emits a directional sound pulse A. Following another time interval Δt, a third node 23, which is adjacent to the second node $\mathbf{2}_2$ but closer to the desired location 4, is activated such that its sound generator 9*a*3 facing the second node $\mathbf{2}_2$ emits a directional sound pulse A. FIG. 2 illustrates three nodes between the initial location L and the target location 4, but it will be understood that the system may comprise fewer (at least two) or more nodes, e.g. nodes $\mathbf{2}_{1\text{-}n}$. For example, FIG. 3 illustrates 13 nodes 2 arranged along a passageway 1. It should also be understood that the other sound generators (i.e. $\mathbf{9}b_{1\text{-}n}$) will be activated in a similar manner if it is desirable to guide individuals in the opposite direction along the pathway.

For an individual P between nodes 1 and 2, the sound pulse A emitted from the sound generator $\mathbf{9}a_1$ in the first node $\mathbf{2}_1$ will be perceived as being at a lower level than the sound pulse A emitted from the sound generator $\mathbf{9}a_2$ in the second node $\mathbf{2}_2$. This directionality assures that there is reduced perception of incoming sound from the node $\mathbf{2}_1$ compared to perception of departing sound from nodes $\mathbf{2}_2$ and then 23. The sequential emission of sound pulses A from the same side directional sound generators $\mathbf{9}a_{1\text{-}n}$ in subsequent nodes $\mathbf{2}_{1\text{-}n}$ creates a spatial effect and an illusion of a sound travelling towards the target location 4. This encourages the individual to follow the sequentially emitted sounds pulses towards the target location. Optionally, the sound pulse emission may be interrupted at intervals by voice instructions such as "follow the sound to safety." The directional effect helps remove ambiguity as to which way to go, and provides an imperative for moving in the desired direction, away from the initial location (e.g. a fire) and towards the target location.

The sound pulse duration $t_A$ and time interval $\Delta t$ may be controlled or pre-programmed according to the specific environment. For example, if the pathway 1 is inside a tunnel og similar passage, the sound pulse duration $t_A$ is advantageously significantly shorter than the tunnel reverberation time. If, for example, the tunnel reverberation time is between 2 and 4 seconds, the sound pulse duration $t_A$ may preferably between 0.2 and 0.5 second, and the time interval $\Delta t$ may be between 0.5 and 1 second. The sound pulse duration $t_A$ may be constant or may be different for each node.

Figure 3:
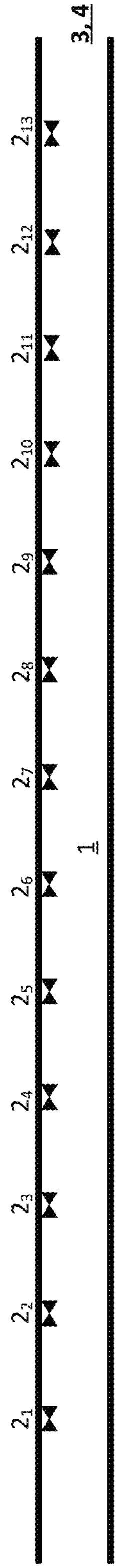
FIG. 3 is a schematic illustration of another embodiment of the auditory guidance system according to the invention.
Figure 4:
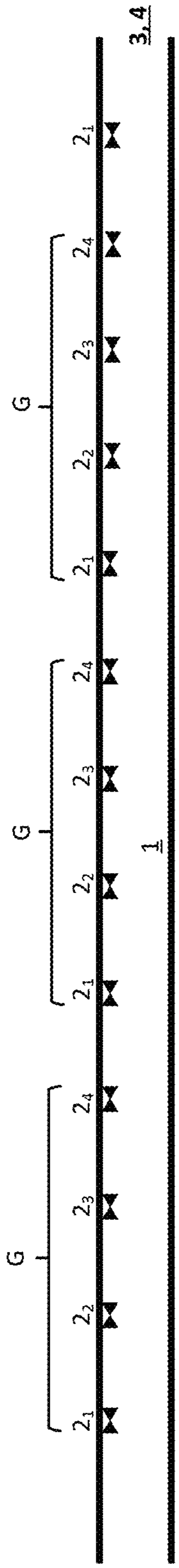
FIG. 4 is a schematic illustration of another embodiment of the auditory guidance method and system according to the invention.

If the target location (e.g. emergency exit 3 or tunnel opening 4) is far away from the initial location L, for example as illustrated in FIG. 3 (a total of 13 nodes), the delay from the first sound pulse is emitted from the first node $\mathbf{2}_1$ and the last sound pulse is emitted from the last node 2*n* (in figure, n=13), may be unacceptably long. It may therefore be desirable to activate groups of nodes individually, for example at the same time. This is illustrated in FIG. 4, where an activation sequence corresponding to the one described above is shown as being be repeated on adjacent groups G of nodes. The pathway is thus divided into smaller segments and the sound level may be adjusted such that multiple segments G can play at the same time without being heard from another section. The number of nodes per segment will vary (depending on for example the distance between the nodes, acoustical properties of the environment, the sound to be used). These parameters may be measured (e.g. by microphones at or in the nodes) and the sound emission may be adjusted accordingly.

The invented auditory guidance method and system is particularly useful for evacuating individuals from a tunnel or other confined space when visibility is low or non-existing, for example in the event of a fire.

The invention claimed is:

1. An auditory guidance system for installation along a predefined pathway in a tunnel, between an initial location and a target location, comprising a plurality of nodes arranged at intervals along the predefined pathway, wherein a first node of the plurality of nodes is a closest node to the initial location and a last node of the plurality of nodes is a closest node to the target location, and wherein each node of the plurality of nodes comprises two directional sound generators wherein each of the two directional sound generators is configured to emit sound in a predetermined direction, wherein the two directional sound generators within each node are pointing in opposite directions along the predefined pathway, wherein adjacent nodes of the plurality of nodes enable, at a location between the adjacent nodes, a perception that the sound generated by a right-hand sound generator of a node of the adjacent node as being substantially lower than the sound generated by a left-hand sound generator of the same node.

2. The system of claim 1, wherein the sound generated by the right-hand sound generator is perceived as being at least 12 dB lower than the sound generated by the left-hand sound generator of the same node.

3. The system of claim 1, wherein each of the two directional sound generators in each node is configured and controlled via a control system to emit a sound pulse of predefined characteristics.

4. The system of claim 3, wherein the characteristics comprise a duration, a pitch, and a volume.

5. The system of claim 3, wherein the sound pulses comprise a sound of bell chimes or a sound of footsteps on pavement.

6. The system of claim 3, wherein the system is configured to emit a same sound pulse from all of the nodes.

7. The system of claim 1, wherein the nodes are configured to be activated in a sequence, from the initial location and towards the target location.

8. The system of claim 1, wherein the two directional sound generators in each node are controlled to emit a same sound pulse at a same time, or are controlled to emit sound pulses in a desired sequence.

9. The system of claim 1, wherein each of the two directional sound generators is configured to emit a sound pulse towards the initial location, in a sequence from the directional sound generator in the first node to the directional sound generator in the last node, each sound pulse emission being interrupted by a constant time interval.

10. The system of claim 4, wherein the duration is constant.

11. An evacuation system in a tunnel, comprising:

an auditory guidance system for installation along a predefined pathway between an initial location and a target location, comprising a plurality of nodes arranged at intervals along the predefined pathway, wherein a first node of the plurality of nodes is a closest node to the initial location and a last node of the plurality of nodes is a closest node to the target location, wherein each node of the plurality of nodes comprises two directional sound generators wherein each of the two directional sound generators is configured to emit sound in a predetermined direction and includes loudspeakers with apertures arranged in an array, wherein the two directional sound generators within each node are pointing in opposite directions along the predefined pathway, wherein adjacent nodes of the plurality of nodes enable, at a location between the adjacent nodes, a perception that the sound generated by a right-hand sound generator of a node of the adjacent node as being substantially lower than the sound generated by a left-hand sound generator of the same node, and wherein the target location comprises an emergency exit or another opening out of the tunnel.

12. An auditory guidance method, for guiding at least one individual along a predefined pathway in a tunnel from an initial location in the tunnel to a target location in the tunnel, comprising:

emitting directional sound pulses from a plurality of nodes arranged at intervals along the predefined pathway between the initial location and the target location, the directional sound pulses being emitted in a sequence at time intervals such that each node emits a directional sound pulse towards the initial location, wherein a second node emits a sound pulse at a time interval following the emission of a sound pulse from a first node, wherein, for each of a third node and one or more subsequent nodes, the respective node emits a sound pulse at the time interval following the emission of a sound pulse from a previous node until a last node has emitted a sound pulse, wherein the sequential emission of sound pulses from the same side directional sound generators creates a spatial effect and an illusion of a sound travelling towards the target location and thus encourages the individual to follow the sequentially emitted sound pulses, wherein the target location comprises an emergency exit or another exit from the tunnel, and wherein the sound pulse duration is determined such that the sound pulse duration is significantly shorter than a reverberation time for the tunnel.

13. The method of claim 12, wherein the time interval is constant.

14. The method of claim 12, wherein the third node and one or more subsequent nodes are located along a single exclusive exit path.

15. The method of claim 12, wherein the method is executed in multiple segments of nodes, either simultaneously or at different intervals.

16. The method of claim 12, wherein an auditory guidance system installed along the predefined pathway between the initial location and the target location comprises the plurality of nodes and performs the emitting step.

* * * * *